March 20, 1951 J. GREWE 2,546,030
DUMPCART
Filed May 13, 1949
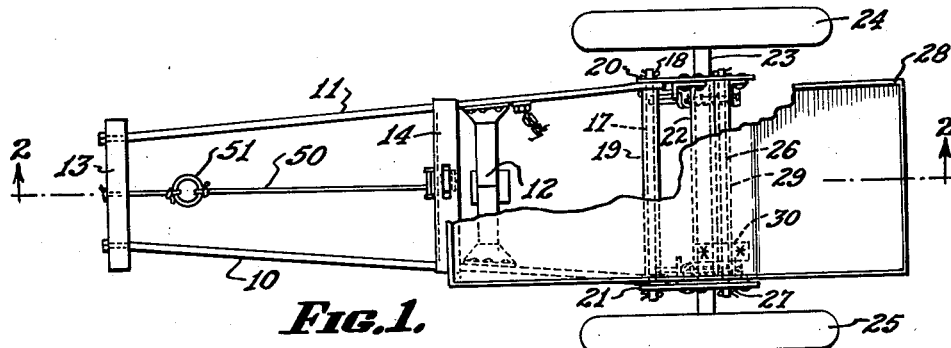
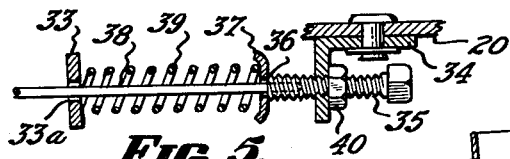
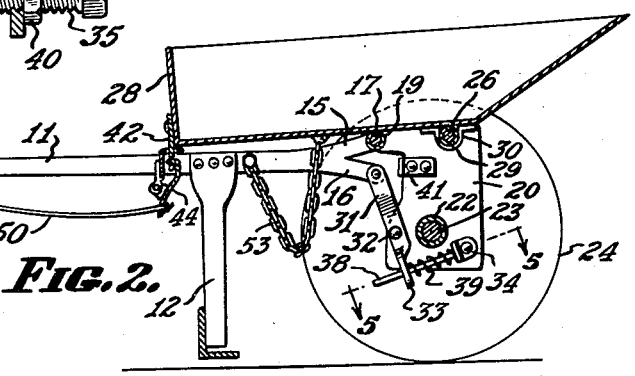
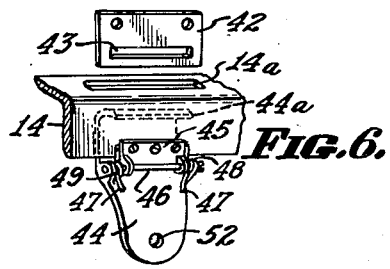
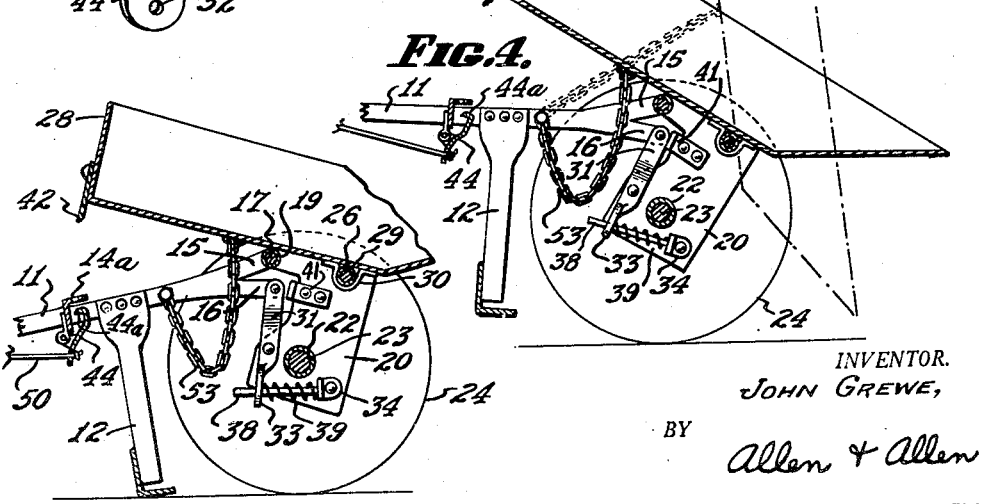
INVENTOR.
JOHN GREWE,
BY
Allen & Allen
ATTORNEYS.

Patented Mar. 20, 1951

2,546,030

UNITED STATES PATENT OFFICE 2,546,030

DUMPCART

John Grewe, Hartwell, Ohio

Application May 13, 1949, Serial No. 93,155

15 Claims. (Cl. 298—19)

My invention relates to novel dump carts or the like and more particularly to improved tilting mechanism incorporated in such carts.

It is an object of my invention to provide a dump cart which is both easy to use and easy to manufacture.

It is a further object of my invention to provide an improved tilting mechanism for use in dump carts and the like.

Another object of my invention is to provide a dump cart which can be moved from full load position to full dump position with a minimum amount of effort by the user.

A still further object of my invention is to provide a tilting mechanism which can be easily applied to either hand powered dump carts or those which are machine driven.

Other objects and advantages of my invention will become apparent during the course of the following description and from an examination of the drawings in which like numerals are used to designate like parts throughout the same and in which, Figure 1 is a top plan view of a dump cart built according to my invention, Figure 2 is a vertical section of such dump cart taken on the line 2—2 of Figure 1 and showing the cart as it appears when in loaded condition, Figure 3 is a view similar to that of Figure 2 but showing the cart in relieved or emptied condition, Figure 4 is a view similar to that of Figures 2 and 3 but showing the cart in the process of being emptied, Figure 5 is an enlarged detail view of the spring means incorporated in my invention in section on the line 5—5 of Figure 2, and Figure 6 is an enlarged perspective view of a latch device incorporated in my invention.

Referring now to these drawings there is indicated at 10 and 11 a frame or control handle to which a forked leg 12 or the like is suitably fastened as by bolts or rivets. Suitable cross bars 13 and 14 also constitute part of the frame handle.

One end of each of the members 10 and 11 may be forked as at 15—16, see Figures 2, 3 and 4. Although the forking 15—16 is shown only for the member 11, it is to be understood that the member 10 is similarly constructed. This particular construction, however, does not constitute a limit of my invention. Positioned in the ends of the forks 15 is a balance rod 17 which is maintained in position by any suitable means such as the cotter pins 18 or the like. Just nicely fitting the balance rod 17 is a spacer tube 19 extending between the inner surfaces of each of the forks 15. Pivotally mounted at either end of the rod 17 and externally of each of the forks 15 are plate like members 20 and 21. Each of these plates 20 and 21 is welded or in any other suitable manner fixed to the axle housing 22. Extending through the housing 22 is the axle 23 on which the wheels 24 and 25 are mounted in the usual manner. The housing 22 is free to turn about the axle and serves as a spacing device for the wheels 24 and 25.

Extending through the plates 20 and 21 is a rod 26 which is maintained in position by means of cotter pins 27 or the like. Mounted for tilting movement about the rod 26 is a carrier bin 28 having a tube 29 fixed across its bottom and maintained in position by means of brackets 30 bolted or otherwise fixed thereto. The tube 29 just nicely receives the rod 26 and extends between the plates 20 and 21 thus also serving as a spacing means. When the dump cart is in the general position illustrated in Figure 3, i. e., not loaded, the carrier bin 28, being pivoted as at 26—29, will rest on the balance rod 17 as shown in this figure.

A stabilizing arm or link 31 is pivoted to the end of the fork 16. As shown in Figures 2, 3 and 4 this arm 31 is also pivoted to the plate 20 as at 32. It is to be understood that a similar arrangement is provided for the other side of the dump cart. Extending laterally from one end of the arm 31 is a lug 33 having a hole 33a therein. Pivotally secured to the plate 20 is a lug or cleat 34. A flange on the lug 34 is threaded so as to receive a threaded bolt member 35. As best seen in Figure 5, the threaded bolt member 35 is provided with a shoulder 36 against which a washer 37 is placed. The extension 38 of the bolt member 35 extends just nicely through the hole 33a provided in the lug 33. A compression spring 39 is placed between the lug 33 and washer 37. The amount of compression in this spring can be adjusted by means of the lock nut 40 provided with the bolt member 35. The purpose and function of this last described arrangement will become more fully apparent during the course of this description. At 41 there is indicated a stop for the link 31 and projecting end of the fork 16, this stop being bolted or otherwise suitably secured to the plate 20.

As best seen in Figure 6, I have indicated a suitable latch means for use in connection with my invention. Depending from the rear wall of the carrier bin 28 is a lug 42 provided with a transverse slot 43. The cross arm 14, which as seen in Figure 6 comprises an angle iron, is provided with a slot 14a which is large enough to receive the lug 42. A trip latch tongue member 44 is hingedly fixed to the cross arm 14 by means of a plate 45, pintle 46 and springs 47, the pintle 46 passing through projecting lugs 48 of the plate 45 and lugs or eyelets 49 on the tongue member 44. A relief cord 50, provided with finger grip means 51, is secured at one end to the cross arm 13 and at its other end to the tongue member 44 by means of the hole 52 provided for that purpose. As shown in Figure 6, the latch end 44a of the tongue member 44 is slightly curved so that when the lug 42 strikes it, it will force the member 44 to move against the action of the springs 47, thus permitting the lug 42 to be depressed through the slot 14a far enough so that the latch end 44a of the tongue member 44 will register with the slot 43. In this last position the action of the springs 47 forces the latch end 44a of the tongue member through the slot 43 and against the solid portion of the cross arm 14, thus securely holding the carrier bin 28 in the position indicated in Figure 2.

In operation my dump cart works as follows. When the dump cart is empty and at rest as seen in Figure 3, the carrier bin 28, which is pivoted at 26, forward of its center of gravity, rests on the spacer tube 19 through which the balance rod 17 extends. In this position the spring 39 is under slight compression resulting from the weight of the carrier bin 28 alone. Thus it will be observed that the fork 16 and stabilizing arm 31 are just slightly removed from the stop 41 fixed to the plate 20. It is to be understood that this same condition will exist at the other side of my dump cart. In this position the dump cart is ready for loading and the operator will simply throw the material to be loaded into the carrier bin 28. As the carrier bin 28 is loaded, it and the rod 17 and plates 20 and 21 will gradually move about the axle 23 exerting a sort of toggle action on the members 16—31, thus compressing the springs 39, until the rear end of the carrier bin 28 moves to a position adjacent the frame control members 10 and 11, in which position the bin is locked into place by the latch means above described. As the bin is so moved from the position of Figure 3 to that of Figure 2 the axle 23 is displaced and moved forward away from the leg 12. At the same time the plate 20 rotates in a counter-clockwise direction (as viewed in these figures) and the fork 16 and link 31 are at their farthermost point from the stop 41.

When the bin is thus in its loaded and locked condition, the operator may lift the leg 12 from the ground by means of the members 10, 11 and 13, and wheel the loaded cart to whatever spot he chooses. This last described position is illustrated in Figure 2. When in such position the dump cart may be taken through very rough terrain, uphill and downhill, without fear of the load being spilled prematurely. As noted, in this position the springs 39 are fully compressed. The exact amount of compression desired may be gained by adjustment of the bolt member 35 as has previously been noted.

When it is desired that the load be dumped, the operator, while holding the cross arm 13, will simply grasp the finger ring 51 and swing the tongue member 44 against the springs 47 thus bringing the latch to released position. Then, due to the action of the expansion of the compression springs 39, the carrier bin 28, together with the plates 20—21 and their associated parts will be rocked in a clockwise direction about the axle 23. The wheels 24 will simultaneously roll back toward the leg 12, bringing the cart to the position of Figure 4, the effect of the springs 39 being limited by the movement of the fork 16 and stabilizing arm 31 against the stop 41. The contact of the arm 31 and fork 16 with the stop 41 prevents further clockwise movement of the members 20—21. Since, however, the center of gravity of the bin 28 has been moved by the very act of lifting the leg 12 from the ground, and by the backward shift of the wheels 24, the momentum gained by the action of the compression springs through the short distance that they operate is usually sufficient to cause the carrier bin 28 to move to the position shown in dotted lines in Figure 4 without further effort on the part of the operator. A very slight lift on the handles will suffice in any event. As a matter of fact, this position may be reached even when the leg 12 is only a slight distance off the ground as is the case in Figure 2 wherein the handle control members 10 and 11 are substantially parallel to the ground. That is to say, it is not always necessary that the handles 10 and 11 be lifted as far as indicated in Figure 4. The amount of extra lift, if any, which must be exerted by the operator depends to some extent on the distribution of the load within the bin. Due to the location of the pivot 26, the operator, when he desires to bring the emptied bin back to loading position, need only thrust the members 10 and 11 slightly forward while at the same time letting the leg 12 approach the ground. This action will cause the bin 28 to be flipped back to the position indicated in Figure 3. As best seen in Figures 2, 3 and 4 I have also provided limiting chains 53 which prevent the bin 28 from being moved too far in the vertical direction.

Although I have described my novel dump cart as being adapted for manual use by an operator, it is quite apparent that it could just as easily be hooked to a tractor, truck or other means of locomotion. In this manner I have thus invented a novel dump cart which might be described as having the general arrangement of a type of wheelbarrow, but which is vastly superior as regards its utility.

It is a particular feature of my invention that little if any extra effort is required of the operator in order to effect a dumping of the material loaded in the bin 28. By simply pulling the cord 50 (the leg 12 having been lifted from the ground) and thus tripping the latch tongue member 44, the bin 28, due to the action of the springs 39 and the change in position of the center of gravity of the bin 28 as occurs when the forked leg 12 is lifted from the ground, will be tilted to its full extent. This novel tilting arrangement is believed to be new and it thus constitutes a distinct feature of my invention.

I have thus developed a dump cart having great maneuverability and one which may be used for many purposes and under many conditions, at all times being in good balance, and yet one that may be quickly emptied by a simple movement of the finger. When the dump cart is in the position illustrated in Figure 2, this being its position when it is loaded and is to be moved from one place to another, the weight of the bin and load is still between the pivot 26 and the operator, thus making for easy handling of the load. When the latch is released, however, the action of the springs is sufficient to move the center of gravity of the weight to a position which is substantially at the pivot 26, the momentum gained by the bin 28 thus being sufficient to cause a complete tilting of the bin. And, as stated before, such complete tilting action is possible without further impetus given the dump cart by the operator, i. e. such action will result even when the members 10 and 11 are in the position indicated in Figure 2, the position shown in Figure 4 of course making the tilting action even more simple.

It is to be understood that various modifications may be made in my invention without departing from the spirit thereof, and I do not intend to be limited by the particular modification herein shown and described except insofar as is pointed out in the subjoined claims.

Having thus described my invention what I claim as new and what I desire to protect by Letters Patent is:

1. In a dump cart or the like a frame, a plate pivoted to said frame, a wheel carrying axle journaled in said plate, a carrier bin pivoted to said plate, a balance rod positioned in said frame, said bin normally resting on said balance rod, a stabilizing arm pivoted at one end to said frame and pivoted at a point intermediate of its ends to said plate, and spring means positioned between the other end of said stabilizing arm and said plate.

2. The device of claim 1 in which said carrier bin is pivoted to said plate at a point forward of its center of gravity, and in which said balance rod is located rearwardly of said pivot point but within the length of said carrier bin, said balance rod being located so as to normally tilt the said bin forward so that its rear end is spaced apart from said frame.

3. The device of claim 2 in which the said spring means tend to maintain the rear end of said carrier bin apart from said frame.

4. The device of claim 3 in which said axle moves forward in relation to said frame when the rear end of said carrier bin is forced towards said frame in opposition to said spring means.

5. The device of claim 4 in which latch means are provided to hold the rear end of said carrier bin in contact with said frame against the action of said spring means.

6. In a dump cart or the like, a frame, plates pivoted to said frame, a wheel carrying axle journaled in said plates, a carrier bin pivoted to said plates, a balance rod positioned in said frame, said bin normally resting on said balance rod, a stabilizing arm for each of said plates, each of said stabilizing arms being pivoted at one end to said frame and pivoted at a point intermediate of its ends to its said plate, and spring means positioned between the other end of each of said arms and its said plate.

7. The device of claim 6 in which said balance rod constitutes the means by which said plates are pivoted to said frame.

8. The device of claim 6 in which said plates are mounted on a common housing through which said axle extends.

9. The device of claim 6 in which said carrier bin is pivoted to said plates by means of a rod extending through said plates.

10. The device of claim 9 in which said carrier bin is provided with a housing through which said last mentioned rod extends.

11. In a dump cart or the like, a pair of spaced frame members, a separate plate member provided for each of said frame members and pivotally secured thereto, a wheel carrying axle journaled in said plate members, a carrier bin pivotally mounted on said plate members, a third frame member on which said carrier bin normally rests, a stabilizer arm pivoted to one of said spaced frame members and to one of said plate members, and spring means mounted between said stabilizer arm and its corresponding plate member, said spring means being mounted so as to oppose movement of said carrier bin about its pivoted connection to said plate members in the direction of said third frame member.

12. A device according to claim 11 in which the said axle is displaced forwardly relative to said frame members when said carrier bin is rotated in the direction of said third frame member and against said spring means.

13. A device according to claim 12 in which a spacer tube is provided for said third frame member, said spacer tube extending between said spaced frame members.

14. A dump cart or the like, comprising a wheel and shaft, a plate journaled on said shaft, a bin pivotally mounted on said plate, a handle structure pivotally secured to said plate, a bin balancing member on said handle structure, the pivot point of said bin being so placed that the bin will normally rest on said balancing member, a link pivoted on said plate intermediate its ends, one end of said link being pivotally secured to said handle structure, and means extending between said plate and the other end of said link tending to rock said plate and bin about said shaft toward said balancing member, thereby moving said shaft and wheel in relation to the center of gravity of said bin.

15. A device according to claim 14 in which said bin balancing member constitutes the means by which said handle structure is pivotally secured to said plate.

JOHN GREWE.

REFERENCES CITED

The following references are of record in the file of this patent:

UNITED STATES PATENTS

| Number | Name | Date |
| --- | --- | --- |
| 1,590,000 | Trowe | June 22, 1926 |
| 1,797,471 | Jones | Mar. 24, 1931 |
| 2,103,866 | Norris | Dec. 28, 1937 |
| 2,448,216 | Gokey | Aug. 31, 1948 |